(12) United States Patent
Mayville et al.

(10) Patent No.: US 11,028,626 B2
(45) Date of Patent: Jun. 8, 2021

(54) ROOF HINGE COVER ATTACHMENT STRATEGIES

(71) Applicant: FORD GLOBAL TECHNOLOGIES, LLC, Dearborn, MI (US)

(72) Inventors: Jeffrey Scott Mayville, Ypsilanti, MI (US); Patrick Reed, Livonia, MI (US); James Brian Slemons, Waterford, MI (US); David James Spolyar, Lake Orion, MI (US); Rong Yao, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 205 days.

(21) Appl. No.: 16/504,608

(22) Filed: Jul. 8, 2019

(65) Prior Publication Data

US 2021/0008966 A1    Jan. 14, 2021

(51) Int. Cl.
  *E05D 5/02*    (2006.01)
  *E05D 11/00*   (2006.01)
  *B60J 5/10*    (2006.01)

(52) U.S. Cl.
  CPC ............ *E05D 5/0207* (2013.01); *B60J 5/106* (2013.01); *B60J 5/107* (2013.01); *E05D 11/0054* (2013.01)

(58) Field of Classification Search
  CPC ........... B60J 5/101; B60J 5/107; B60R 13/04; B60R 13/06; B62D 25/06; E05D 5/0207; E05D 11/0054
  USPC .............................. 296/1.08, 56, 106, 146.11
  See application file for complete search history.

(56) References Cited

U.S. PATENT DOCUMENTS

| 4,433,866 A * | 2/1984 | Hagiwara | B62D 25/12 296/146.11 |
|---|---|---|---|
| 7,669,916 B2 * | 3/2010 | Munenaga | B60J 5/107 296/146.8 |
| 7,695,039 B2 | 4/2010 | Sakamoto | |
| 8,256,825 B1 * | 9/2012 | Dryja | B62D 25/07 296/146.8 |
| 8,641,118 B2 * | 2/2014 | Coakley | B60R 9/058 296/1.08 |
| 8,646,834 B2 * | 2/2014 | Coakley | B60R 13/04 296/210 |
| 8,979,181 B2 | 3/2015 | Slack et al. | |
| 10,221,600 B2 | 3/2019 | Slemons et al. | |
| 2008/0073929 A1 * | 3/2008 | Kimura | B60J 5/101 296/57.1 |
| 2019/0032383 A1 | 1/2019 | Wilks et al. | |

FOREIGN PATENT DOCUMENTS

| JP | 2007176300 A | 7/2007 |
|---|---|---|
| JP | 2015147441 A | 8/2015 |

* cited by examiner

*Primary Examiner* — Jason S Daniels
(74) *Attorney, Agent, or Firm* — David Coppiellie; Carlson, Gaskey & Olds

(57) ABSTRACT

Mounting strategies for locating and securing roof hinge covers to vehicle roofs. An exemplary roof hinge cover may be mounted relative to a roof component (e.g., roof panel, body side panel, bracket, etc.). A locator may be received through the roof hinge cover and into a locating hole of the roof component. One or more clips that are connected to the roof hinge cover may be received within locating openings of a bracket. The bracket supports at least a portion of the roof hinge cover.

20 Claims, 4 Drawing Sheets

ROOF HINGE COVER ATTACHMENT STRATEGIES

TECHNICAL FIELD

This disclosure relates to vehicle roof hinge covers and associated mounting features for locating and fixating the roof hinge covers onto vehicle roofs.

BACKGROUND

Sport utility vehicles (SUVs), vans, hatchbacks, crossovers, and other vehicles may have an opening defined in a rear portion of the vehicle body. The openings establish cargo spaces. Liftgates are commonly used to selectively open and close the openings in the rear portions of the vehicle. The liftgates may be rotatably connected to the vehicle bodies by hinges.

SUMMARY

A vehicle roof assembly according to an exemplary aspect of the present disclosure includes, among other things, a roof component, a roof hinge cover mounted relative to the roof component, a locator received through the roof hinge cover and into a locating hole of the roof component, a bracket including a locating opening, and a clip connected to the roof hinge cover and received within locating opening of the bracket. The bracket supports at least a portion of the roof hinge cover.

In a further non-limiting embodiment of the foregoing vehicle roof assembly, the locator and the clip are each located at different locations of the roof hinge cover.

In a further non-limiting embodiment of either of the foregoing vehicle roof assemblies, the locating hole is formed through a tab of the roof component, and the tab extends to a rear edge of the roof component.

In a further non-limiting embodiment of any of the foregoing vehicle roof assemblies, the locator extends through the locating hole and into a wet area of the vehicle roof assembly.

In a further non-limiting embodiment of any of the foregoing vehicle roof assemblies, the locator is a pin or a clip.

In a further non-limiting embodiment of any of the foregoing vehicle roof assemblies, the bracket includes a first section that extends inside a roof rail or a roof ditch ornamentation cover of the vehicle roof assembly, a second section rearward of the first section, and a third section at least partially between the first and second sections.

In a further non-limiting embodiment of any of the foregoing vehicle roof assemblies, the second section includes the locating opening and a second locating opening, and the third section includes a third locating opening. The clip is secured within the locating opening, a second clip is located in the second locating opening, and a third clip is located in the third locating opening.

In a further non-limiting embodiment of any of the foregoing vehicle roof assemblies, the clip is attached to a first clip housing of the roof hinge cover, the second clip is attached to a second clip housing of the roof hinge cover, and the third clip is attached to a third clip housing of the roof hinge cover.

In a further non-limiting embodiment of any of the foregoing vehicle roof assemblies, the bracket is contiguous with a portion of the roof component.

In a further non-limiting embodiment of any of the foregoing vehicle roof assemblies, the locator is held within a recessed housing of the roof hinge cover.

A vehicle according to another exemplary aspect of the present disclosure includes, among other things, a roof, a liftgate, a hinge pivotably connecting the liftgate to the roof, a roof rail or a roof ditch ornamentation cover mounted to the roof, a roof hinge cover mounted over the hinge and positioned rearward of the roof rail or the roof ditch ornamentation cover, and a bracket extending at least partially inside the roof rail or the roof ditch ornamentation cover and establishing a beam surface that supports at least a portion of the roof hinge cover.

In a further non-limiting embodiment of the foregoing vehicle, a first portion of the bracket extends inside the roof rail or the roof ditch ornamentation cover and a second portion of the bracket that is rearward of the first portion establishes the beam surface.

In a further non-limiting embodiment of either of the foregoing vehicles, the bracket includes a third portion that extends transversely relative to the first and second portions.

In a further non-limiting embodiment of any of the foregoing vehicles, the second portion includes a first locator opening and a second locator opening, and the third portion includes a third locator opening. A first clip of the roof hinge cover is received within the first locator opening, a second clip of the roof hinge cover is received within the second locator opening, and a third clip of the roof hinge cover is received within the third locator opening.

In a further non-limiting embodiment of any of the foregoing vehicles, a locator is held within a recessed housing of the roof hinge cover and is received within a locator opening of a roof component of the roof.

In a further non-limiting embodiment of any of the foregoing vehicles, a portion of the bracket is located axially between the hinge and an outboard edge of the roof.

In a further non-limiting embodiment of any of the foregoing vehicles, the bracket includes a plurality of ribs adapted to maintain a positioning of the bracket relative to the roof rail or the roof ditch ornamentation cover.

In a further non-limiting embodiment of any of the foregoing vehicles, the roof hinge cover is located and secured relative to a roof panel of the roof by a locator, a first clip, a second clip, and a third clip.

In a further non-limiting embodiment of any of the foregoing vehicles, a portion of the bracket extends over top of a mounting base of the hinge.

A vehicle according to another exemplary aspect of the present disclosure includes, among other things, a roof including a roof panel, a liftgate, a hinge pivotably connecting the liftgate to the roof, a roof rail mounted to the roof, a roof hinge cover positioned rearward of the roof rail and at least partially covering the hinge, a locator received through the roof hinge cover and into a locating hole of the roof panel, a bracket including a first section received inside the roof rail, a second section rearward of the first section and including a first locating opening and a second locating opening, and a third section transverse to the first and second sections and including a third locating opening, a first clip connected to the roof hinge cover and received within the first locating opening, a second clip connected to the roof hinge cover and received within the second locating opening, and a third clip connected to the roof hinge cover and received within the third locating opening.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details mounting strategies for locating and securing roof hinge covers to vehicle roofs. An exemplary roof hinge cover may be mounted relative to a roof component (e.g., roof panel, body side panel, bracket, etc.). A locator may be received through the roof hinge cover and into a locating hole of the roof component. One or more clips that are connected to the roof hinge cover may be received within locating openings of a bracket. The bracket supports at least a portion of the roof hinge cover. These and other features of this disclosure are described in greater detail below.

Figure 1:
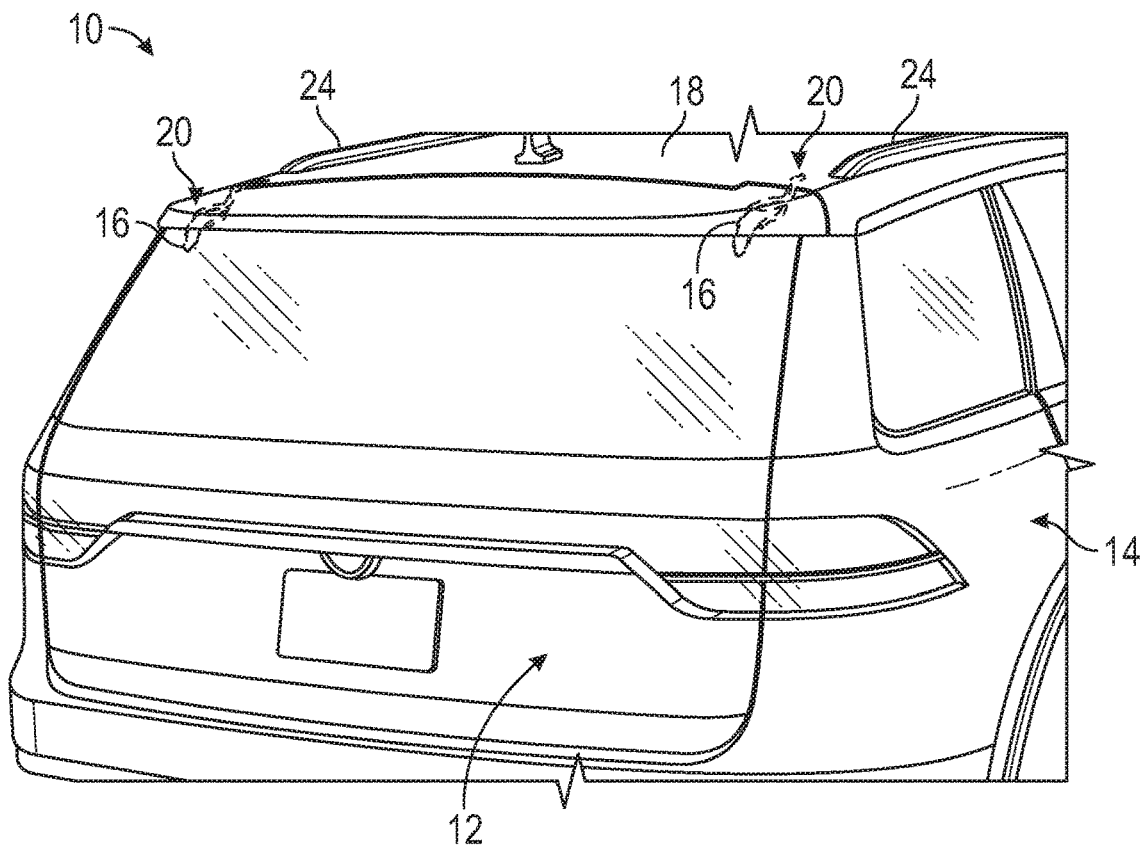
FIG. 1 is a rear perspective view of a vehicle equipped with a liftgate.

FIG. 1 illustrates select portions of a vehicle 10. The vehicle 10 may be a sport utility vehicle (SUV), a crossover, a car, a van, or any other type of vehicle. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily to scale, and some features may be exaggerated or minimized to emphasize certain details of a particular component.

The vehicle 10 includes a liftgate 12 that is rotatable between open and closed positions to selectively open and close an opening defined in a rear section of a vehicle body 14 of the vehicle 10. The opening that is selectively enclosed by the liftgate 12 may establish a cargo space of the vehicle 10, for example.

The liftgate 12 may be pivotally mounted to the vehicle body 14 by two or more hinges 16. In an embodiment, one hinge 16 is located on each of the driver side and the passenger side of the vehicle body 14, and each hinge 16 may connect to both a roof 18 of the vehicle body 14 and an upper edge of the liftgate 12 for pivotally connecting the liftgate 12 to the vehicle body 14.

Figure 2:
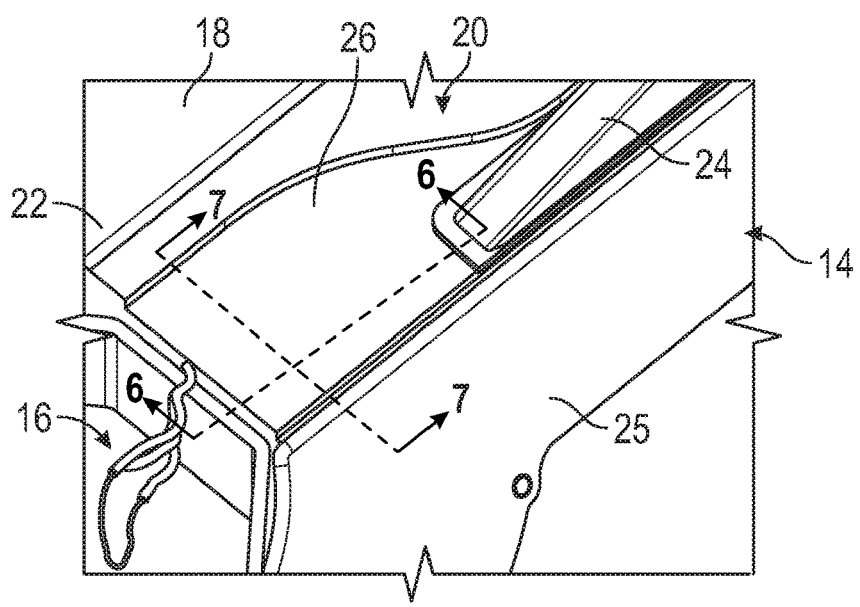
FIG. 2 is a blown-up view of a roof assembly of the vehicle of FIG. 1.
Figure 3:
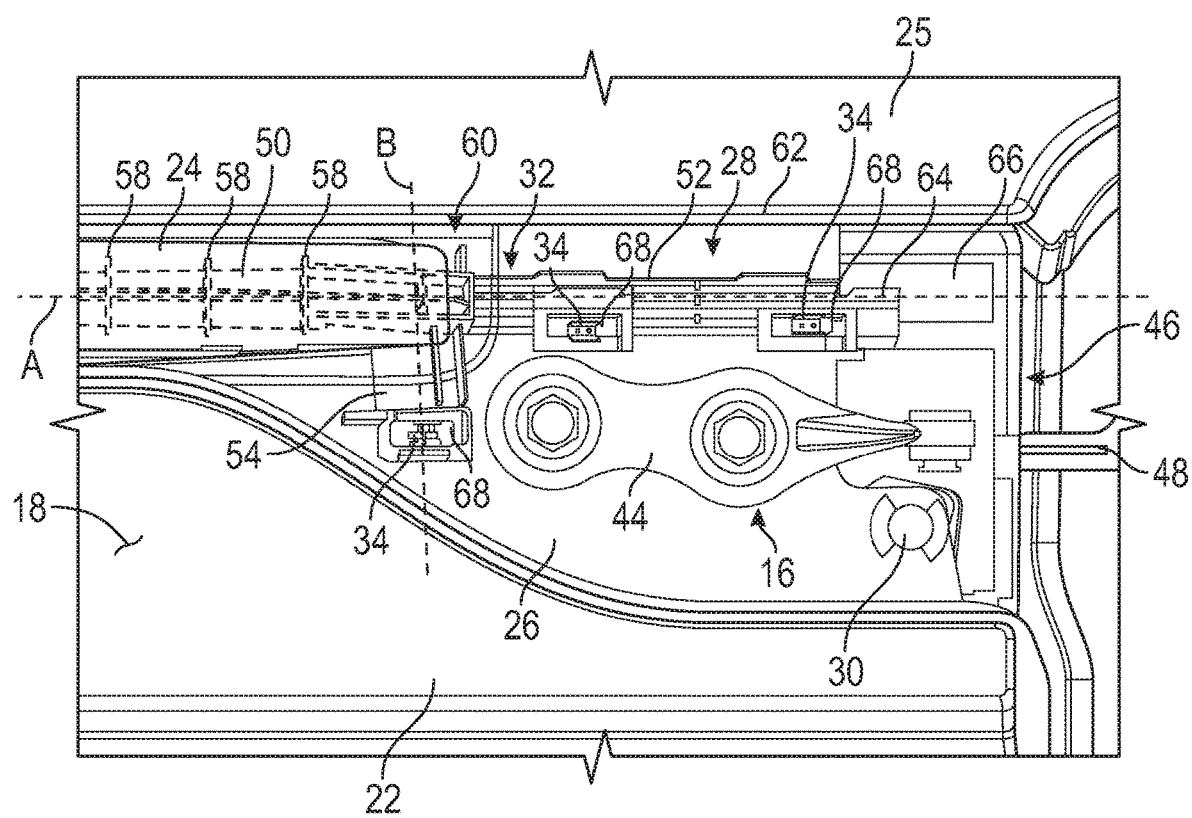
FIG. 3 is a top view of the roof assembly of FIG. 2.
Figure 4:
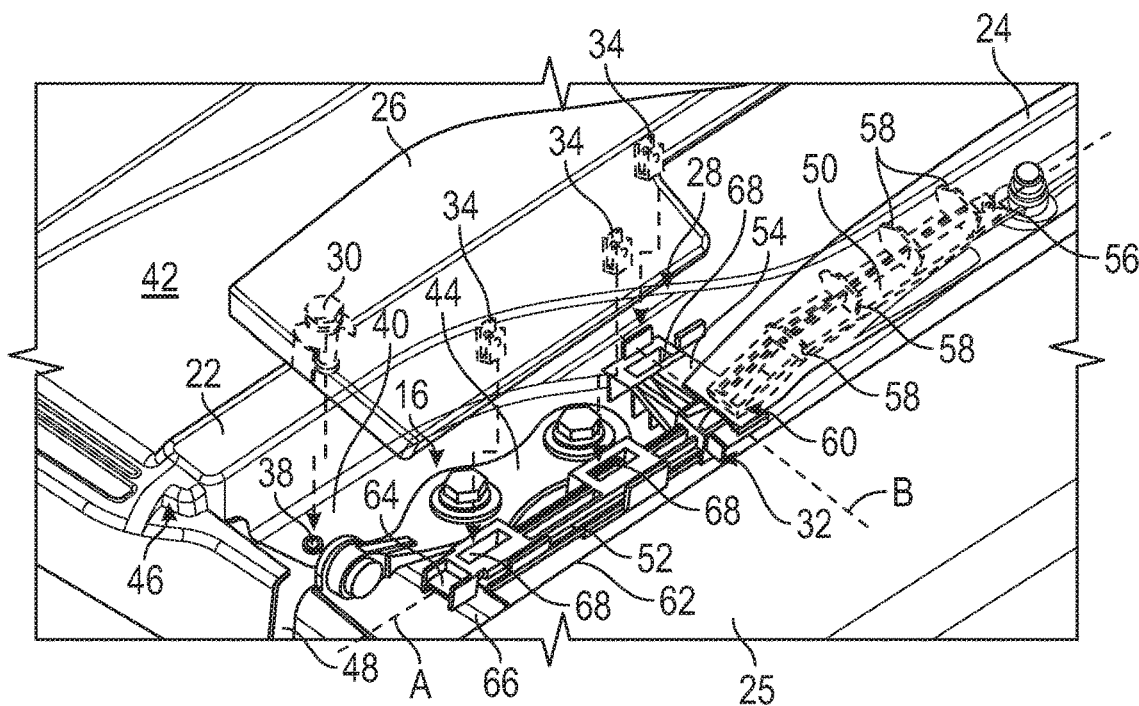
FIG. 4 is an exploded view of the roof assembly of FIG. 2.

Select portions of the roof 18 of the vehicle 10 of FIG. 1 are illustrated in FIGS. 2, 3, and 4. The roof 18 may include a roof assembly 20 that includes a roof component 22, a roof rail 24, and a roof hinge cover 26 for covering the hinge 16 in order to provide a more aesthetically appealing appearance to the roof assembly 20. The roof assembly 20 of the embodiment shown in FIGS. 2-4 is located on a passenger side of the vehicle body 14. A similar roof assembly can also be provided on the driver side of the vehicle body 14 (as shown, for example, in FIG. 1), or at any other location where the hinges 16 are located.

The roof component 22 could be any component of the roof 18. Examples include but are not limited to a roof panel, a side body panel, and a bracket.

The roof assembly 20 may additionally include a mounting system 28 for mounting the roof hinge cover 26 to the roof 18. The mounting system 28 may include a locator 30, a bracket 32, and a plurality of clips 34.

The locator 30 may be held within a recessed housing 36 (best shown in FIG. 5) of the roof hinge cover 26 and may be received by a locating hole 38 (see FIG. 4) formed in the roof component 22. The locator 30 may be configured as a pin, a clip, or any other locating device. The locator 30 locates the roof hinge cover 26 relative to the roof 18 in each of the forward, backward, left, and right directions and may therefore be considered a four-way locator 30 of the mounting system 28. The locator 30 may further aid in controlling margins and flushness of the roof hinge cover 26 relative to the roof 18 and a body side 25 of the vehicle body 14.

Figure 7:
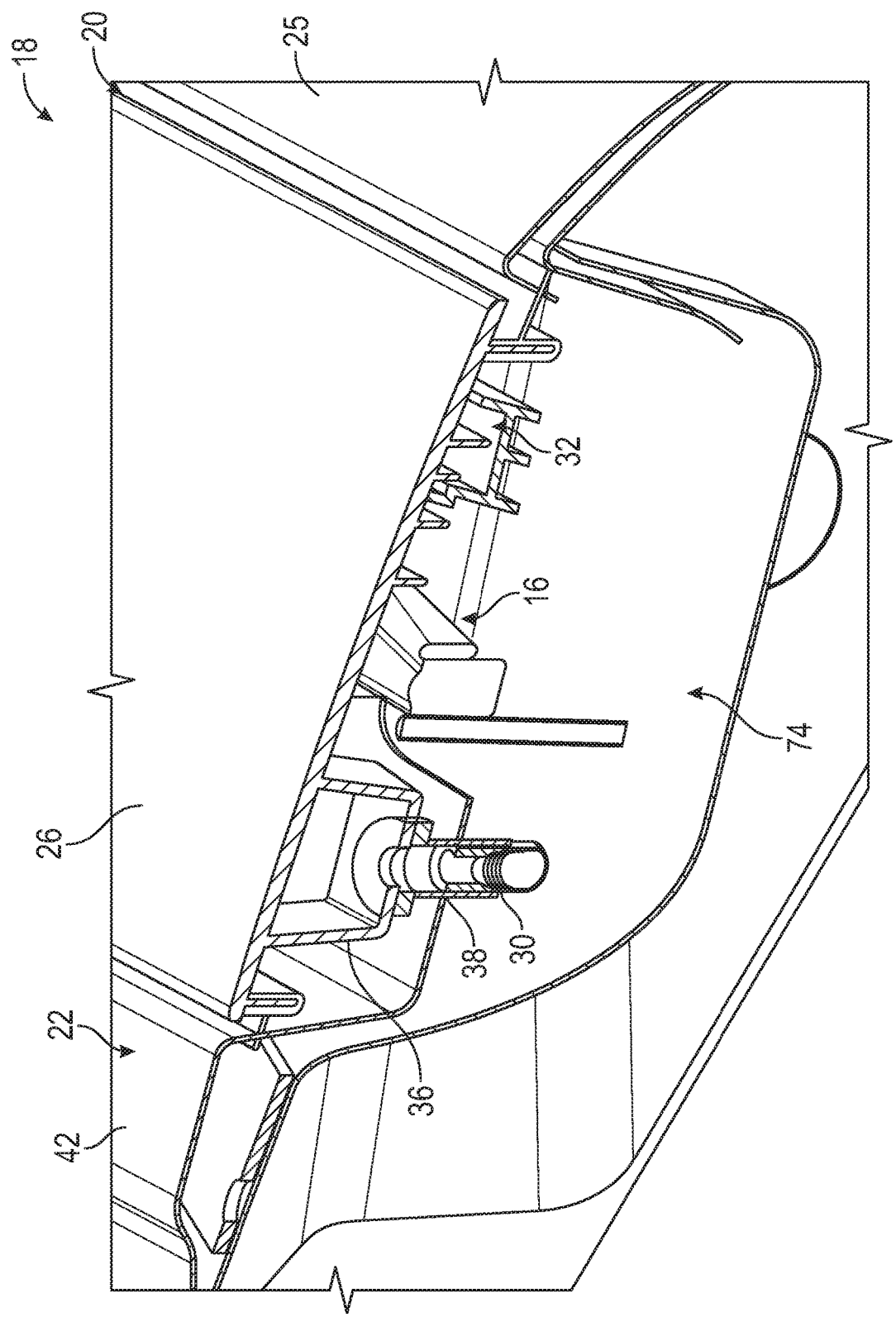
FIG. 7 is a cross-sectional view through section 7-7 of FIG. 2.

In an embodiment, the locating hole 38 is formed in a tab 40 of the roof component 22 (best shown in FIGS. 4 and 7). The tab 40 may be slightly recessed relative to an exterior surface 42 of the roof component 22. The locating hole 38 may be located in a section of the tab 40 that is adjacent to both a vehicle body-side section 44 of the hinge 16 and a rear edge 46 of the roof 18. A liftgate-side section 48 of the hinge 16 may extend aft of the rear edge 46 for connection to the liftgate 12.

The bracket 32 may include a first section 50, a second section 52 that extends rearward of the first section 50 (e.g., in a mounted position of the bracket 32), and a third section 54 that is at least partially disposed between the first and second sections 50, 52. Together, the first section 50, the second section 52, and the third section 54 of the bracket 32 establish a single-piece, monolithic bracket component for supporting the roof hinge cover 26.

The first section 50 of the bracket 32 may extend inside the roof rail 24, which may be part of a roof rack system for securing cargo atop the roof 18. Alternatively, the first section 32 could extend inside a roof ditch ornamentation cover. The first section 50 may be clipped into place inside the roof rail 24 by a clip 56 (see FIG. 4). In an embodiment, the first section 50 of the bracket 32 includes a plurality of ribs 58. The ribs 58 are configured to maintain the first section 50 of the bracket 32 substantially parallel to the roof rail 24.

The second section 52 of the bracket 32 may extend rearward of the first section 50 at a location between a rear end 60 of the roof rail 24 and the hinge 16. The first and second sections 50, 52 of the bracket 32 may extend in parallel with one another along a longitudinal axis A of the bracket 32. The longitudinal axis A is generally parallel to the length of the vehicle 10. In a mounted position, the second section 52 of the bracket 32 may extend axially between the vehicle body-side section 44 of the hinge 16 and an outboard edge 62 of the roof component 22. The outboard edge 62 is located at a junction between the roof component 22 and the body side 25 of the vehicle body 14. A rear portion 64 of the second portion 52 of the bracket 32 may extend over top of a mounting base 66 of the hinge 16.

The third section 54 of the bracket 32 may extend along a transverse axis B. In an embodiment, the transverse axis B is about perpendicular to the longitudinal axis A. In a mounted position, the third section 54 of the bracket 32 is disposed forward of the vehicle body-side section 44 of the hinge 16.

The second section 52 and the third section 54 of the bracket 32 may each include one or more locating openings 68. In an embodiment, the second section 52 includes two locating openings 68 and the third section 54 includes one locating opening 68, however, the total number of locating openings 68 provided in each of the second and third sections 52, 54 of the bracket 32 is not intended to limit this disclosure.

Each locating opening 68 may receive one of the clips 34 for securing the roof hinge cover 26 to the bracket 32. The bracket 32 therefore assists to support and control the flushness of the roof hinge cover 26 relative to the exterior surface 42 of the roof component 22. The bracket 32 also aligns the roof hinge cover 26 relative to the roof rail 24.

In an embodiment, the mounting system 28 employs a total of three clips 34 and one locator 30. However, other configurations may also be suitable.

Figure 5:
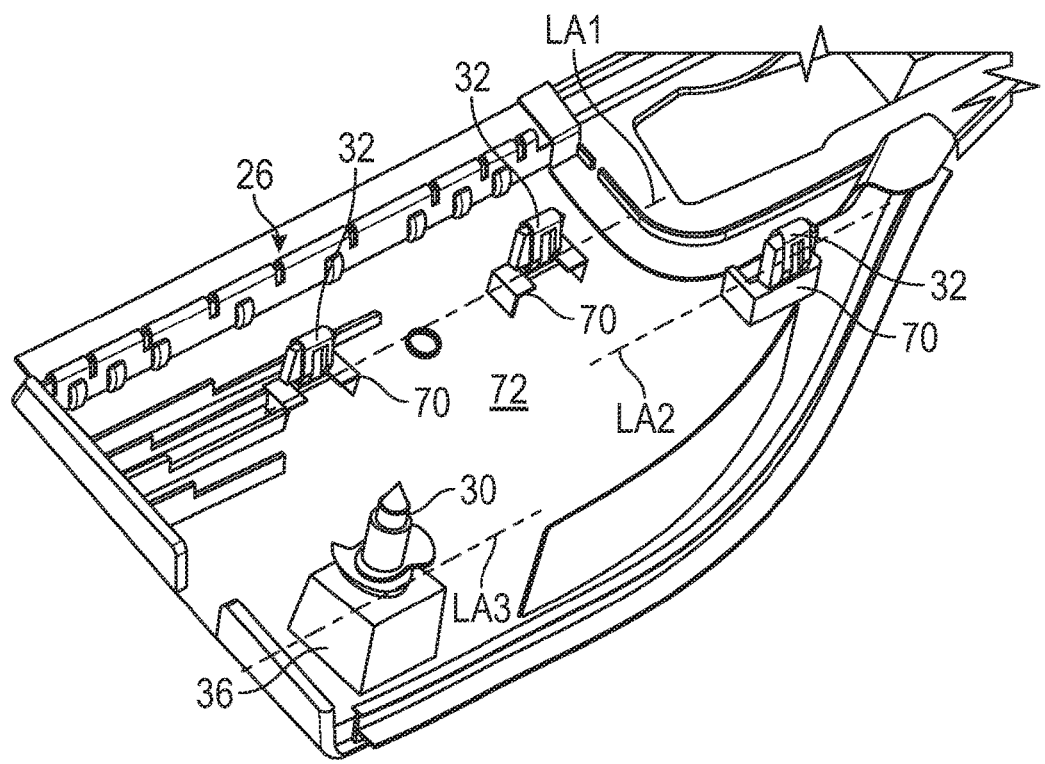
FIG. 5 is a bottom view of a roof hinge cover of the roof assembly of FIGS. 2-4.

Each of the clips 34 may be secured to clip housings 70 that protrude from a bottom surface 72 of the roof hinge cover 26 (see FIG. 5). The placement of the clip housings 70 and the recessed housing 36 of the roof hinge cover 26 may be selected such that, once the roof hinge cover 26 is secured to the roof component 22 and the bracket 32, the roof hinge cover 26 is firmly supported at multiple outboard locations of the roof hinge cover 26.

The clip housings 70 and the recessed housing 36 may be positioned in multiple axes relative to one another in order to provide a more firm feeling attachment relative to the roof 18. In an embodiment, two of the clip housings 70 are disposed along a longitudinal axis LA1 of the roof hinge cover, another clip housing 70 is disposed along a longitudinal axis LA2 of the roof hinge cover 26, and the recessed housing 36 is disposed along a longitudinal axis LA3 of the roof hinge cover 26 (see FIG. 5). The longitudinal axes LA1, LA2, and LA3 are each laterally offset from one another.

The bracket 32 may be constructed of a thermoplastic material, the roof component 22 may be constructed of a metallic material, and the roof hinge cover 26 may be constructed of thermoplastic and/or metallic materials. However, other materials or combinations of materials are also contemplated within the scope of this disclosure.

Figure 6:
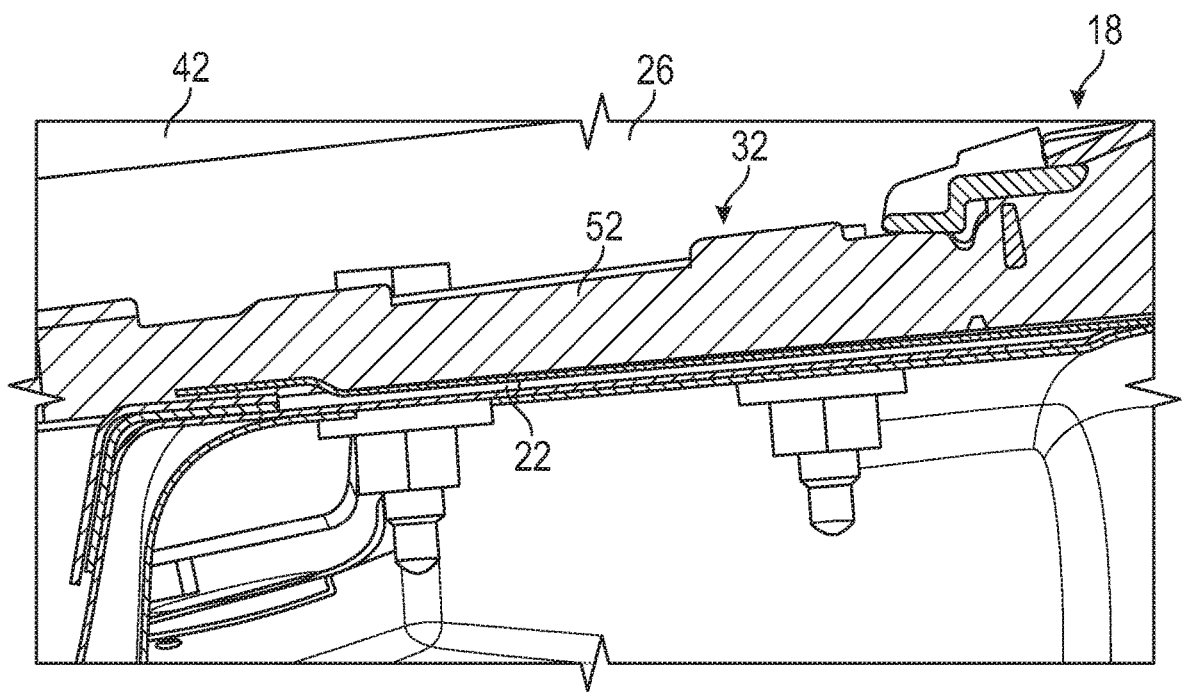
FIG. 6 is a cross-sectional view through section 6-6 of FIG. 2.

Referring now to the cross-sectional view of FIG. 6, the bracket 32 is contiguous with a section of the roof component 22 once positioned relative to the roof 18 and therefore assists in controlling the flushness of the roof hinge cover 26 relative to the exterior surface 42 of the roof component 22. The second section 52 of the bracket 32 establishes a solid beam for supporting the rear and side edges of the roof hinge cover 26, thereby providing a firm feel.

Referring now to the cross-sectional view of FIG. 7, the locator 30 may extend through the locating hole 38 once the roof hinge cover 26 is secured to the roof component 22 and to the bracket 32. The interconnection between the locator 30 and the locating hole 38 may help control the margins and flushness of the roof hinge cover 26 relative to the exterior surface 42 of the roof component 22. In an embodiment, the locator 30 extends into a wet area 74 of the roof 18. However, the locator 30 does not intrude inside the vehicle 10, thereby reducing any risk of water leaking into the vehicle interior around the locator 30.

The roof assemblies of this disclosure provide a robust attachment strategy for mounting roof hinge covers to roof components. The proposed attachment strategies provide improved craftsmanship, firm feel, reduced assembly time, an aesthetically pleasing appearance, reduced risk of water leakage into the vehicle interior, and improved serviceability.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle roof assembly, comprising:
   a roof component;
   a roof hinge cover mounted relative to the roof component;
   a locator received through the roof hinge cover and into a locating hole of the roof component;
   a bracket including a locating opening; and
   a clip connected to the roof hinge cover and received within locating opening of the bracket,
   wherein the bracket supports at least a portion of the roof hinge cover.

2. The vehicle roof assembly as recited in claim 1, wherein the locator and the clip are each located at different locations of the roof hinge cover.

3. The vehicle roof assembly as recited in claim 1, wherein the locating hole is formed through a tab of the roof component, wherein the tab extends to a rear edge of the roof component.

4. The vehicle roof assembly as recited in claim 1, wherein the locator extends through the locating hole and into a wet area of the vehicle roof assembly.

5. The vehicle roof assembly as recited in claim 1, wherein the locator is a pin or a clip.

6. The vehicle roof assembly as recited in claim 1, wherein the bracket includes a first section that extends inside a roof rail or a roof ditch ornamentation cover of the vehicle roof assembly, a second section rearward of the first section, and a third section at least partially between the first and second sections.

7. The vehicle roof assembly as recited in claim 6, wherein the second section includes the locating opening and a second locating opening, and the third section includes a third locating opening, wherein the clip is secured within the locating opening, a second clip is located in the second locating opening, and a third clip is located in the third locating opening.

8. The vehicle roof assembly as recited in claim 7, wherein the clip is attached to a first clip housing of the roof hinge cover, the second clip is attached to a second clip housing of the roof hinge cover, and the third clip is attached to a third clip housing of the roof hinge cover.

9. The vehicle roof assembly as recited in claim 1, wherein the bracket is contiguous with a portion of the roof component.

10. The vehicle roof assembly as recited in claim 1, wherein the locator is held within a recessed housing of the roof hinge cover.

11. A vehicle, comprising:
a roof;
a liftgate;
a hinge pivotably connecting the liftgate to the roof;
a roof rail or a roof ditch ornamentation cover mounted to the roof;
a roof hinge cover mounted over the hinge and positioned rearward of the roof rail or the roof ditch ornamentation cover; and
a bracket extending at least partially inside the roof rail or the roof ditch ornamentation cover and establishing a beam surface that supports at least a portion of the roof hinge cover.

12. The vehicle as recited in claim 11, wherein a first portion of the bracket extends inside the roof rail or the roof ditch ornamentation cover and a second portion of the bracket that is rearward of the first portion establishes the beam surface.

13. The vehicle as recited in claim 12, wherein the bracket includes a third portion that extends transversely relative to the first and second portions.

14. The vehicle as recited in claim 13, wherein the second portion includes a first locator opening and a second locator opening, and the third portion includes a third locator opening, wherein a first clip of the roof hinge cover is received within the first locator opening, a second clip of the roof hinge cover is received within the second locator opening, and a third clip of the roof hinge cover is received within the third locator opening.

15. The vehicle as recited in claim 14, comprising a locator held within a recessed housing of the roof hinge cover and received within a locator opening of a roof component of the roof.

16. The vehicle as recited in claim 11, wherein a portion of the bracket is located axially between the hinge and an outboard edge of the roof.

17. The vehicle as recited in claim 11, wherein the bracket includes a plurality of ribs adapted to maintain a positioning of the bracket relative to the roof rail or the roof ditch ornamentation cover.

18. The vehicle as recited in claim 11, wherein the roof hinge cover is located and secured relative to a roof panel of the roof by a locator, a first clip, a second clip, and a third clip.

19. The vehicle as recited in claim 11, wherein a portion of the bracket extends over top of a mounting base of the hinge.

20. A vehicle, comprising:
a roof including a roof panel;
a liftgate;
a hinge pivotably connecting the liftgate to the roof;
a roof rail mounted to the roof;
a roof hinge cover positioned rearward of the roof rail and at least partially covering the hinge;
a locator received through the roof hinge cover and into a locating hole of the roof panel;
a bracket including a first section received inside the roof rail, a second section rearward of the first section and including a first locating opening and a second locating opening, and a third section transverse to the first and second sections and including a third locating opening;
a first clip connected to the roof hinge cover and received within the first locating opening;
a second clip connected to the roof hinge cover and received within the second locating opening; and
a third clip connected to the roof hinge cover and received within the third locating opening.

* * * * *